(12) United States Patent
Perras et al.

(10) Patent No.: US 8,873,367 B2
(45) Date of Patent: Oct. 28, 2014

(54) GENERIC PACKET FILTERING

(75) Inventors: Michelle Perras, Montreal (CA); Juan Carlos Zuniga, Montreal (CA); Alexander Reznik, Titusville, NJ (US); Reeteshkumar Varshney, Gurgaon (IN); Imran Khan, Kolkata (IN)

(73) Assignee: InterDigital Patent Holdings, Inc., Wilmington, DE (US)

( * ) Notice: Subject to any disclaimer, the term of this patent is extended or adjusted under 35 U.S.C. 154(b) by 145 days.

(21) Appl. No.: 13/411,146

(22) Filed: Mar. 2, 2012

(65) Prior Publication Data

US 2012/0230235 A1  Sep. 13, 2012

Related U.S. Application Data

(60) Provisional application No. 61/449,275, filed on Mar. 4, 2011.

(51) Int. Cl.
  *H04W 4/00* (2009.01)
  *H04L 29/06* (2006.01)
  *H04W 28/06* (2009.01)
(52) U.S. Cl.
  CPC ............... *H04L 69/22* (2013.01); *H04W 28/06* (2013.01); *H04L 69/14* (2013.01)
  USPC .......................................... 370/210; 709/227
(58) Field of Classification Search
  USPC .......................................... 370/310; 709/227
  See application file for complete search history.

(56) References Cited

U.S. PATENT DOCUMENTS

| 2005/0008009 A1 | 1/2005 | Chen et al. |
| 2006/0176880 A1* | 8/2006 | Bare et al. ..................... 370/392 |
| 2010/0226384 A1* | 9/2010 | Prabhakar et al. ............. 370/412 |

FOREIGN PATENT DOCUMENTS

| EP | 1496661 A1 | 1/2005 |
| EP | 1503548 A1 | 2/2005 |
| EP | 1729461 A1 | 12/2006 |
| EP | 1496661 * | 2/2013 |
| WO | WO 01/60011 * | 8/2001 |
| WO | WO 01/60011 A1 | 8/2001 |

OTHER PUBLICATIONS

The Linux Foundation, "Bonding", Nov. 19, 2009, pp. 1-26.

* cited by examiner

*Primary Examiner* — Man Phan
*Assistant Examiner* — Mewale Ambaye
(74) *Attorney, Agent, or Firm* — Condo Roccia Koptiw LLP

(57) ABSTRACT

Embodiments contemplate one or more techniques for packet filtering. One or more embodiments may apply specific routing and/or forwarding rules on some or each packet when a device has one or more, or multiple, interfaces. Contemplated filtering techniques may be implemented in a module and/or without modifying an IP stack. The contemplated packet filtering techniques may apply to a terminal in uplink and/or downlink as well as to any network node. An incoming packet table may be created using 5-tuple, 6-tuple, and/or tags, among other mechanisms, to support incoming and/or outgoing packet filtering.

13 Claims, 13 Drawing Sheets

GENERIC PACKET FILTERING

CROSS REFERENCE TO RELATED APPLICATIONS

This application claims the benefit of U.S. Provisional Application No. 61/449,275, titled "Generic Packet Filtering Methodology", filed on Mar. 4, 2011, the content of which being hereby incorporated by reference herein in its entirety, for all purposes.

BACKGROUND

Packet filters may evaluate or analyze "packets" which may be transferred between one or more computing devices that are in communication with each other, for example via the Internet and/or via wireless communication.

An Internet Protocol (IP) router may permit or may block the flow of various types of IP packets via IP packet filtering. Packet filtering can be applied to incoming and outgoing IP flow traffic. Input packet filters may define what inbound IP traffic may be allowed to be accepted on one or more interfaces. Output packet filters may define what IP traffic may be sent from one or more interfaces.

Packet filtering tools may be available in different operating systems (OSs), such as but not limited to "Netfilter" on Linux and Windows; "WinpkFilter" on Windows; and "LittleSwitch" on Apple's OS, for example.

SUMMARY

One or more techniques for packet filtering are contemplated. Embodiments contemplate the application of specific routing and/or forwarding rules on some packets or each packet when a device may have one or more, or multiple, interfaces. One or more embodiments may be implemented without modifying the IP stack.

Embodiments contemplate a wireless transmit/receive unit (WTRU) that may be configured to implement packet filtering. The WTRU may include a first interface and a second interface. The WTRU may be configured to apply at least one tag to at least one outgoing packet and to execute an outgoing packet filtering function. The outgoing packet filtering function may determine, based at least in part on the at least one tag, at least one of the first interface or the second interface via which to send the outgoing packet. The at least one tag may be removed from the at least one outgoing packet and the at least one outgoing packet may be sent via at least one of the determined first interface or second interface.

In one or more embodiments, at least one mode may be configured on the WTRU and executing the outgoing packet filtering function may include executing an outgoing packet filtering function that may be associated with the at least one mode. In addition, the outgoing packet filtering function may be executed at a time proximate to the sending of the at least one outgoing packet.

In one or more embodiments, at least one hook may be registered on the WTRU, and executing the outgoing packet filtering function may include calling the at least one hook. Also, the determining by the outgoing packet filtering function may be executed by the at least one hook at a kernel level at a time proximate to the sending of the at least one outgoing packet.

Embodiments contemplate a wireless transmit/receive unit (WTRU) that may be configured to implement packet filtering. The WTRU may be configured to execute an outgoing packet filtering function. The outgoing packet filtering function may determine a number of respective individual interfaces that may be included in an interface mapping on the WTRU. The outgoing packet filtering function may identify the respective individual interfaces that may be included in the interface mapping. Also, the outgoing packet filtering function may determine, based at least in part on the determined number of mapped interfaces, a number of required duplicates of at least one outgoing packet. The required number of duplicates of the at least one outgoing packet may be created. In addition, either the at least one outgoing packet or one of the duplicates of the at least one outgoing packet may be respectively sent via each of the individual interfaces that may be included in the interface mapping.

Embodiments contemplate a wireless transmit/receive unit (WTRU) that may be configured to implement packet filtering. The WTRU may be configured to identify at least one incoming packet, where the at least one incoming packet may be received via an interface of the WTRU. The WTRU may also be configured to identify at least one outgoing packet, where the at least one outgoing packet may correspond to the at least one incoming packet. Also, an outgoing packet filter function may be executed and the outgoing packet filter function may identify the interface on which the at least one incoming packet was received. In addition, the at least one outgoing packet may be sent via the same interface via which the incoming packet was received.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be exemplary and in no way limit the scope of the application. As used herein, the article "a", absent further qualification or characterization, may be understood to mean "one or more" or "at least one", for example.

Figure 1A:
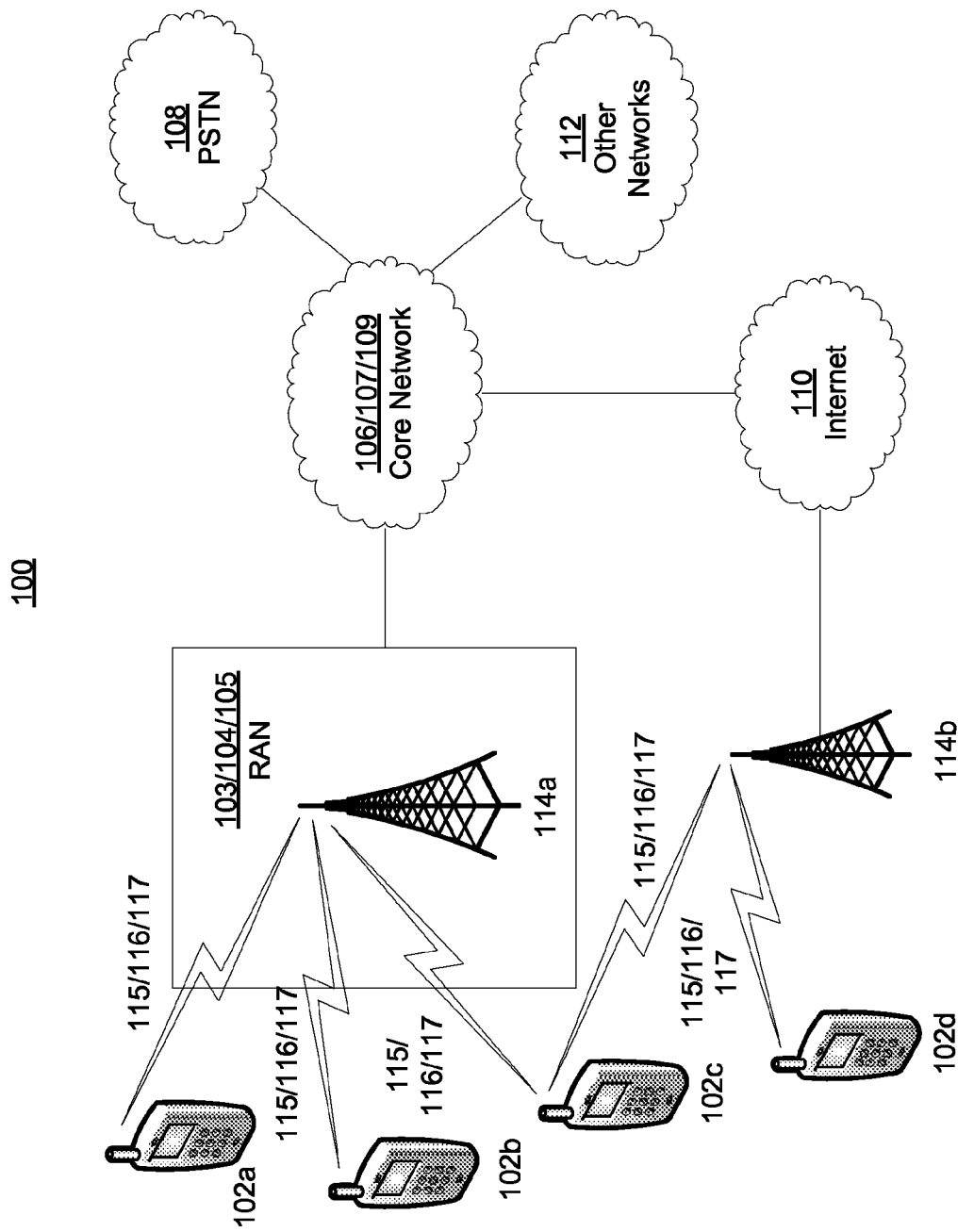
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 2x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
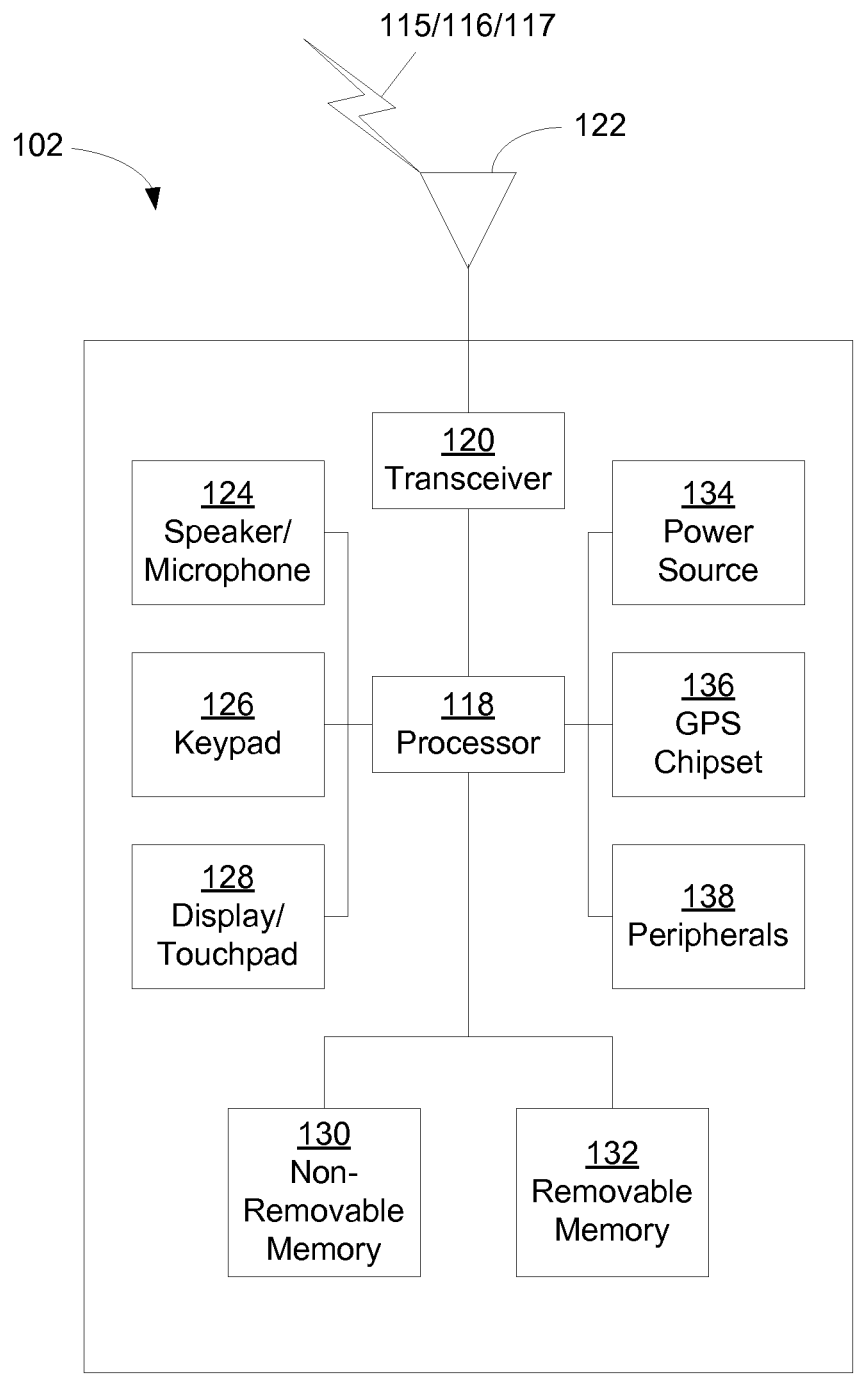
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
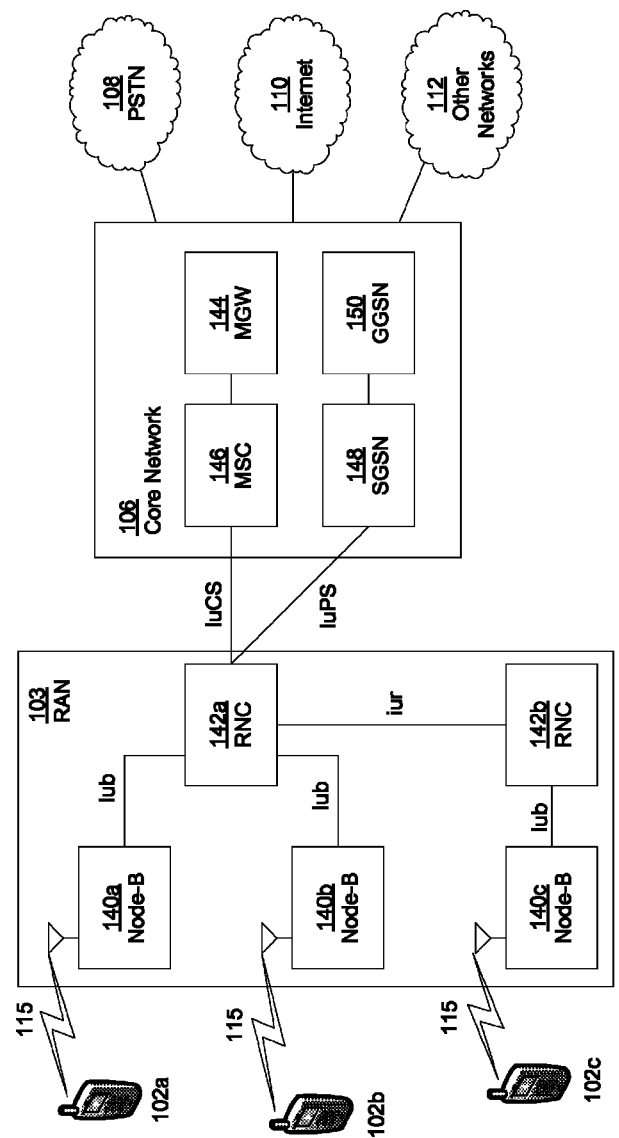
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
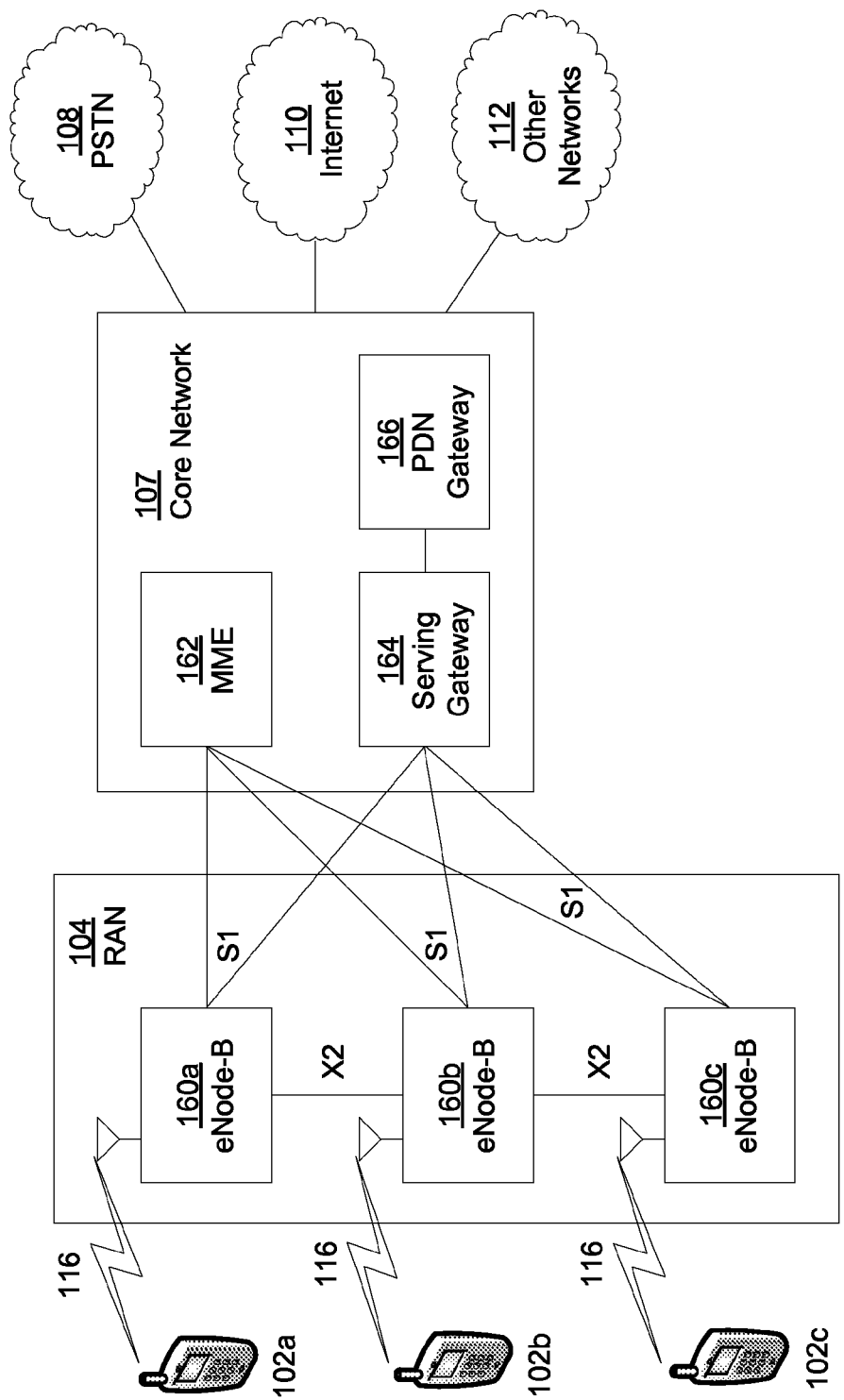
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
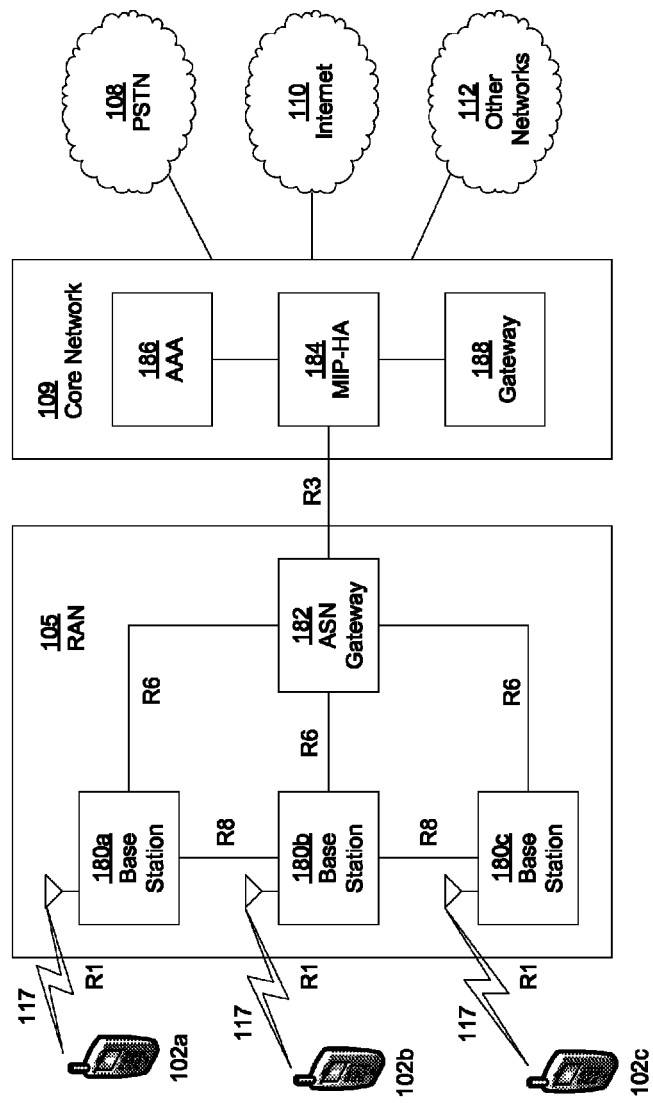
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Embodiments recognize that specific packet filtering and routing rules that support different features and requirements. For example, embodiments recognize tools that may map interfaces together such as bonding, bridging, and packet filtering. Also by way of example, an Ethernet bonding driver may be available on Linux OS. This bonding module is a tool that may handle interface mapping and packet routing. The bonding module may allow the configuration of a virtual interface that could hide underneath physical interfaces to the upper layers (e.g., IP stack and higher). Such virtual interfaces may present a single virtual interface to Internet Protocol (e.g., master) and may bond the underlying interfaces (e.g., slaves) to the master, for example. The bonding module may control the forwarding of packets from determined appropriate interface(s) to the application and/or IP layer, and in one or more embodiments perhaps transparently to the application and/or IP layer, for example. The forwarding algorithm may be different, depending of the desired behavior. This forwarding mechanism may be configured by selecting an appropriate MODE. By way of example, and not limitation, values defined for the MODE may include: 1) balance-rr or 0; 2) active-backup or 1; 3) balance-xor or 2; 4) broadcast or 3; 5) 802.3ad or 4; 6) balance-tlb or 5; and 7) balance-alb or 6.

Embodiments recognize that bridging is a type of forwarding technique that may be used in packet-switched computer networks. Unlike routing for example, bridging may make no assumptions about where in a network a particular address is located. Instead, bridging may depend on flooding, as well as examination of source addresses in received packet headers to locate one or more unknown devices. Once a device has been located, its location may be recorded in a table where the MAC address may be stored—so as to preclude the need for further broadcasting, for example. Bridging may occur at OSI Model Layer 2 (data-link layer), for example. Also by way of example, and not limitation, a bridge may direct frames according to hardware assigned MAC addresses.

Embodiments recognize one or more techniques to perform packet filtering. For instance in the Linux OS, packet filtering may be done using the "libnetfilter_queue" tool that allows performing user-space packet queuing. With this tool, the packet may be intercepted in the kernel space and passed to the application space. However, depending on the kind of filtering that may need to be done, with the "libnetfilter_queue" tool—a packet that is to be passed to the application is an IP packet so the only fields that may be available for filtering are the fields in the TCP(UDP)/IP headers and above. Embodiments recognize that filtering based on other parameters, for example such as the physical interface from which the packet has been received, may not be possible with tools like the libnetfilter_queue, since the physical interface information may not be available at the application space level, among other reasons. One or more contemplated incoming and/or outgoing packet filtering techniques (such as, for example, where outgoing packet(s) may be sent on the same interface as a corresponding incoming packet(s) was received) may utilize and/or access other parameters, such as but not limited to an incoming physical interface, for example.

Embodiments recognize that filtering may be done using a 5-tuple grouping: source/destination IP addresses, source/destination port numbers and protocol type, for example. And embodiments contemplate that filtering based on other parameters, such as the physical interface from which the packet has been received, may not be possible via the 5-tuple technique alone, since the physical interface information may not be available at the application space level.

Embodiments contemplate one or more techniques and devices to implement packet filtering. The contemplated embodiments may be used to apply specific, filtering, routing, and/or forwarding rules on some or each packet when a device, such as a wireless transmit/receive unit (WTRU), which may have one or more (or multiple) interfaces, for example.

One or more embodiments contemplate configurable operational modes that may enable heretofore un-provided functionalities or requirements by associating one or more outgoing filtering functions to the mode. Alternatively or additionally, one or more embodiments contemplate the use of one or more outgoing packet filtering hooks that may be executed at the kernel level, for example. In addition, one or more embodiments—including those that contemplate configurable operational modes and embodiments that contemplate the use of outgoing packet filtering hooks in the kernel level—may use packet filtering hooks executed at the kernel level to handle incoming packet filtering. One or more embodiments may be implemented in a module, perhaps without modifying the IP stack.

By way of example, and not limitation, one or more embodiments contemplate one or more of the following functionalities: the usage of the incoming interface, in addition to the 5-tuple (or 6-tuple with IPv6), to build an incoming packet mapping table and/or implement outgoing packet filtering; kernel-space hooks (perhaps instead of user-space applications, for example); higher layer identification of flows by adding tags to outgoing packets, where the contemplated tags may or may not be related to 5-tuple (or 6-tuple), e.g., where matching criteria may not be based on 5-tuple (or 6-tuple); a capability to have a system map contemplated tags to a source IP address (e.g., in such scenarios the contemplated tag may be related to the 5-tuple); a capability in outgoing packets filtering hook(s) to use the contemplated tags for packet filtering; and/or a capability in outgoing packets filtering hook(s) to remove the contemplated tags once the outgoing interface selection is done, for example.

Embodiments contemplate that devices that may have one or more, or multiple, interfaces may require heretofore un-provided functionalities to support, among other requirements, connecting to different networks on each interface. To support these requirements and others, embodiments contemplate that incoming packets may need to be filtered before reaching the IP stack. Such filtering may enable information gathering that may be needed later on to apply specific routing or forwarding rules to outgoing packets, for example. Embodiments contemplate that incoming packet filtering may be used for other purposes, e.g., to manipulate or modify the received data, etc.

Embodiments contemplate that one or more incoming packet filtering algorithms (if and where any may be needed) and/or the outgoing packet filtering may need to be configured on a group of physical interfaces, which may be mapped together (e.g., perhaps with the binding application described herein).

In embodiments that contemplate the configuration of one or more operational modes, one or more contemplated functionalities may be enabled by introducing operational modes that may be applied to the physical interfaces, for example. One or more embodiments contemplate that one or more mapping tables may be maintained with the operational modes and the associated rule or rules to be applied on outgoing packets.

One or more embodiments contemplate that incoming and/or outgoing packets may be filtered per IP flow based on, at least in part, the 5-tuple (source/destination IP addresses, source/destination port numbers and protocol type), or for IPv6, the 6-tuple (5-tuple+IP flow level), for example.

Embodiments contemplate that flows may be identified by higher layers by adding a specific tag to the outgoing packets. Packets having identical 5-tuple (or 6-tuple) may be tagged differently. Packet filtering may be done based on these tags, for example. One or more embodiments contemplate that the tags may be used for assignment of flow-specific IP source addresses. For example, the 5-tuple (or 6-tuple in IPv6) may be created with a generic (or default) source IP address. Embodiments contemplate that a logical interface (LIF) may use flow-specific IP addresses to distinguish outgoing flows. The LIF may substitute an appropriate flow-specific IP address based on the flow-tag and then may remove the tag. Additionally, the reverse operation may be applied to a corresponding incoming stream. For example, the terminal's flow-specific IP addresses may be destination IP addresses (since these are incoming) In embodiments where tags may be used, the destination IP addresses may be changed to generic destination IP addresses and/or flow tags may be appended to incoming packets. This generic packet filtering may make enable packet filtering based on any field or fields (e.g., from application to link layer fields).

In any of the contemplated embodiments, packet filtering may be done using hooks instead of queues. Embodiments recognize that queues may have limitations, and that with the hooks, the filtering may be done at the kernel level (as opposed to the application level using queues, for example). Embodiments also contemplate that, with the hooks, access may be permitted to the socket buffer (skb) which may allow access to the interface used for the packet reception, for example.

In one or more embodiments—including embodiments that contemplate one or more configurable operational modes and embodiments that contemplate the use of outgoing packet filtering hooks in the kernel level, for example,—the incoming packet filtering may be configured by registering a PRE-ROUTING hook. The packet filtering tool may intercept the incoming packets and then may call the registered hook. In this hook, the desired packet filtering may be applied on incoming packets. For example, specific information may be saved, and/or the packet information may be modified, etc. In one or more embodiments, the hook may be called at the kernel level, for example.

In one or more embodiments—including embodiments that contemplate the use of outgoing packet filtering hooks in the kernel level—a PREROUTING hook may be registered for outgoing packet filtering. The packet filtering tool may intercept the outgoing packets and may call the registered hook. The desired packet filtering (e.g., outgoing packet filtering or packet manipulation) may be done in the hook, which may be executed at the kernel level, for example.

Alternatively or additionally, in one or more embodiments—including embodiments that contemplate one or more configurable operational modes—instead of registering a hook, one or more outgoing packet filtering functions may be associated with a heretofore un-provided and/or un-configured operational mode or modes (perhaps as defined in a bonding module, for example). The one or more outgoing filtering functions may be executed at various times a packet needs to be transmitted or each time a packet needs to be transmitted, for example.

In one or more embodiments—including embodiments that contemplate one or more configurable operational modes and embodiments that contemplate the use of outgoing packet filtering hooks in the kernel level—packets that may not match any or a sufficient number of outgoing rules and/or filters may follow one or more pre-configured rules (e.g., broadcasting or transmitting on all interfaces). Similarly, one or more pre-configured rules may be combined with outgoing rules or filters so that a designated or preferred outcome may be achieved.

The exemplary embodiments presented herein illustrate both specific and generally contemplated functionalities. For example, one or more embodiments contemplate packet multiplication (i.e., some or all outgoing packets may be replicated and sent on multiple mapped interfaces). This may be referred to as "duplication" or "multiplication" behavior, for example and not limitation.

In embodiments that contemplate one or more configurable operational modes, a "multiplicate" mode may be configured. The multiplicate mode may replicate and transmit outgoing packets on some or all interfaces that may mapped together. When "multiplicate" mode is configured, the outgoing packets may be intercepted and the outgoing packet filtering function, associated with multiplicate mode, may be executed in order to determine on which interfaces the outgoing packets may be sent and/or how many copies may be generated.

In embodiments that contemplate the configuration of the multiplicate mode, outgoing packet filtering functions associated with multiplicate mode may be executed at various times that a packet may need to be transmitted or each time that a packet may need to be transmitted. Additionally or alternatively, in embodiments in which one or more kernel level executed outgoing packet filtering hooks may be used, a packet filtering hook may be registered. In one or more embodiments, the outgoing packets may be intercepted by the packet filtering tool and the registered hook may be called at various times that a packet may need to be transmitted or each time that a packet may need to be transmitted.

Figure 2:
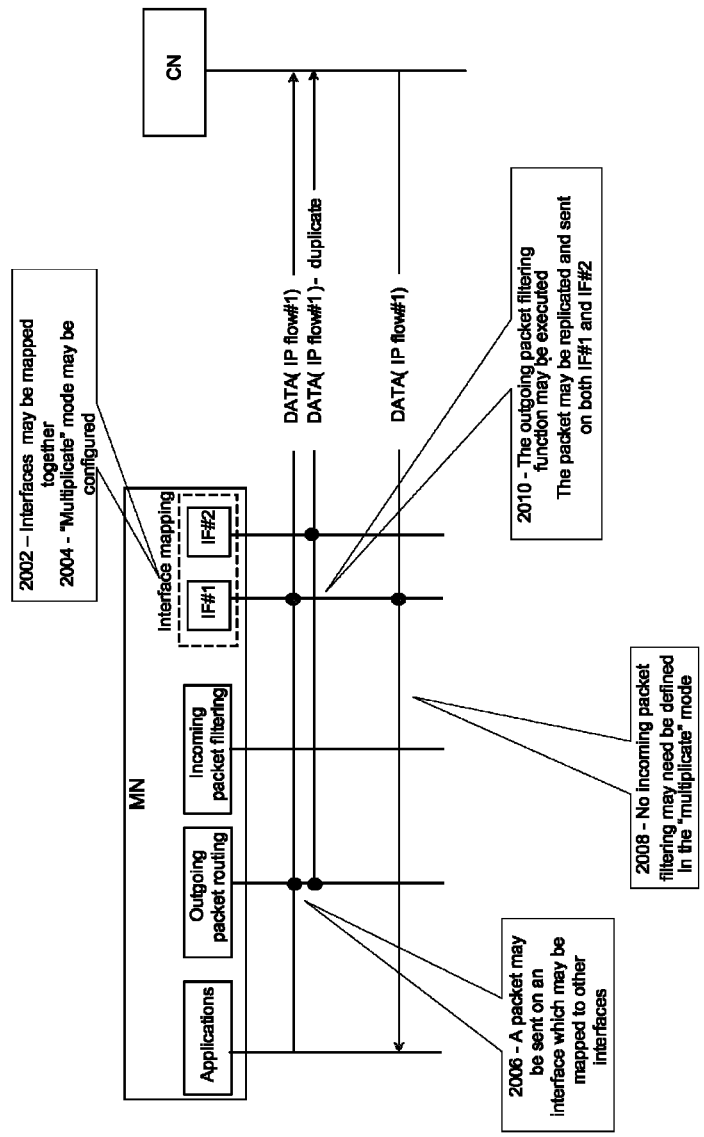
FIG. 2 is an exemplary illustration of packet filtering and/or routing techniques consistent with embodiments.

Embodiments contemplate that the outgoing packet filtering function may obtain a list of mapped interfaces. The number of mapped interfaces may determine how many copies of the outgoing packet may be done, for example. Each outgoing packet may be sent over some or all associated interfaces. FIG. 2 is an exemplary illustration of outgoing packet routing behavior when either a multiplicate mode or multiplication behavior may be configured, or when one or more kernel level executed outgoing packet filtering hooks may be used.

Referring to FIG. 2, at 2002, a first interface (IF #1) and a second interface (IF #2) may be mapped together. The interfaces may be part of a mobile node such as a wireless transmit/receive unit (WTRU), for example. At 2004, in embodiments that contemplate the configuration of one or more operational modes, a multiplicate mode may be configured. At 2006, one or more packets may be sent on an interface (e.g., IF #1) that may be mapped to one or more other interfaces (e.g., IF #2). At 2008, in one or more embodiments, no incoming packet filtering may need be defined in the either the embodiments with the multiplicate mode configured or in embodiments in which one or more kernel level executed outgoing packet filtering hooks may be used. At 2010, an outgoing packet filtering function may be executed and/or the one or more packets may be replicated and sent on both IF #1 and IF #2.

One or more embodiments contemplate packet mirroring (e.g., some or all packets associated to a specific IP flow sent on the same physical interface as the one used for the reception of this IP flow).

Some embodiments in which one or more operational modes may be configured may have a "mirror" mode configured. A mirror mode may transmit outgoing packets on the same interface as the packets were received. When a "mirror" mode is configured, the outgoing packets may be intercepted and the outgoing packet filtering function may be executed in order to determine the interface in which outgoing packets may be sent. In one or more embodiments, some or all packets associated with a specific IP flow may be sent on the same interface (e.g., same physical interface) as the interface that may have been used for the reception of the IP flow.

In embodiments which contemplate the configuration of one or more operational modes and/or in embodiments that may employ one or more kernel level executed outgoing packet filtering hooks, incoming packets may be intercepted in order to create a list of IP flows (e.g., considering 5-tuple) and/or corresponding incoming interfaces. The list may be used by the outgoing packet filter, for example. To intercept the incoming packets, a NETFILTER PREROUTING hook may be registered, by way of example and not limitation. For example, embodiments contemplate a way to get the index of the incoming physical interface may be to use the skb_iif field of some or each incoming packet and call the existing dev_get_by_index function.

Figure 3:
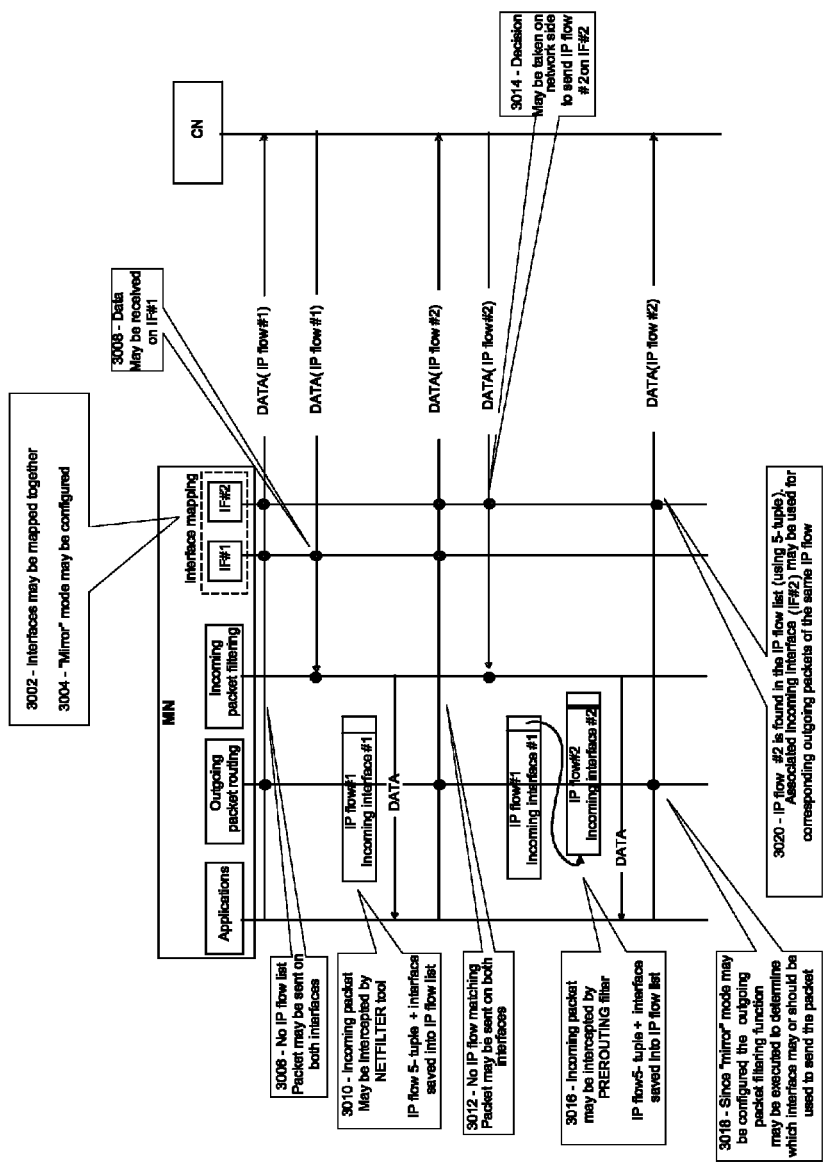
FIG. 3 is another exemplary illustration of packet filtering and/or routing consistent with embodiments.

The IP flow information from the socket buffer (skb), along with the incoming interface, may be stored in a linked list whenever a new IP flow is detected. FIG. 3 illustrates an example of such techniques. By way of example, an IP flow may be identified by a 5-tuple.

In embodiments in which one or more operational modes may be configured, the outgoing packet filtering function associated with mirror mode may be executed at various times a packet may need to be transmitted or each time a packet may need to be transmitted. In one or more embodiments, the outgoing interface indicated in the packet may be overridden at this point.

Additionally or alternatively, in embodiments in which one or more kernel level executed outgoing packet filtering hooks may be used, a NETFILTER hook (e.g., an outgoing packet filtering function) may have been registered, for example. The outgoing packets may be intercepted by the NETFILTER tool and the registered hook may be called some or each time a packet may need to be transmitted. The packet may be transmitted on the selected outgoing interfaces at this point, for example.

Embodiments contemplate that outgoing packet filtering may be based on the IP flow 5-tuple and/or on the incoming interface information. Embodiments contemplate that this information may be saved when incoming packets are received, for example. One or more algorithms may compare the outgoing IP flow tuple, obtained from the skb, with the saved incoming IP flow tuple. If a match is found, the incoming interface may be obtained from the IP flow list. One or more embodiments contemplate that this same incoming interface may be used for the outgoing packet. FIG. 3 is an exemplary illustration of the packet filtering and routing behavior when "mirror" mode is configured regarding embodiments that contemplate one or more configurable operational modes. FIG. 3 is also an exemplary illustration of packet filtering and routing behavior for embodiments in which one or more kernel level executed outgoing packet filtering hooks may be used.

Referring to FIG. 3, at 3002, a first interface (IF #1) and at least a second interface (IF #2) may be mapped together on a mobile node (MN) which may be a wireless transmit/receive unit (WTRU). At 3004, in embodiments that contemplate one or more configurable operational modes, a "mirror" mode may be configured. At 3006, where there may be no IP flow list, one or more packets may be sent on both IF #1 and IF #2 to a correspondent node (CN), or the like, of a communication network. At 3008, data may be received on IF #1. At 3010, one or more incoming packets may be intercepted by a NETFILTER tool, for example, and saved to an IP flow list. At 3012, where no IP flows may match, one or more packets may be sent on both interfaces. At 3014, a decision may be made on the network side to send an IP flow #2 to the WTRU on IF #2.

At 3016, one or more incoming packets may be intercepted by a PREROUTING filter, for example, and saved into the IP flow list. At 3018, in embodiments which contemplate one or more configurable modes, where a mirror mode may be configured—the outgoing packet filtering function may be executed to determine, at least in part, which interface may be used to send the packet, or in some embodiments perhaps should be used to send the packet. Alternatively or additionally, at 3018, in embodiments in which one or more kernel level executed outgoing packet filtering hooks are implemented, the one or more outgoing packet filtering hooks may determine which interface may be used to send the packet, or in some embodiments perhaps should be used to send the packet. At 3020, IP flow #2 may be found in the IP flow list, perhaps using the 5-tuple for identification. In one or more embodiments, the interface associated with the receipt of incoming packets that correspond to the outgoing packets may be used to send the outgoing packets. For example, as IF #2 received IP flow #2, then IF #2 may be used to send outgoing packets that correspond to the received IP flow #2.

One or more embodiments contemplate packet filtering using tags (e.g., some or all packets associated with a specific flow may be tagged and may be sent on the interface specified by the one or more configured rules). An exemplary implementation may include the direction of application level "control" packets to be sent on a first interface (IF #1) and other type of data to be sent on a second interface (IF #2). One or more of such embodiments may be referred to as "using tags" or "tagging" behavior, by way of example and not limitation.

In embodiments in which one or more modes may be configured, a configurable operational mode may be defined. The operational mode may be called "tagging", for example and not limitation. A tagging mode may filter outgoing packets based on tags and may transmit the outgoing packets on the interface specified by one or more configured rules.

When a "tagging" mode is configured, the outgoing packets may be tagged by one or more higher layers. The outgoing packets may be intercepted by an outgoing packet filtering function. The filtering function may determine, perhaps based on the tags and/or the one or more configured rules, via which interface the outgoing packets may be sent. In some embodiments, the tags may be removed, prior to sending the packets. Flow-specific IP source addresses may be substituted for the source addresses in the original packet. Similarly for incoming packets, flow-specific IP destination addresses may be removed and replaced by generic destination IP addresses and/or appropriate flow tags.

The one or more rules may be configured either locally (e.g., by the user or local applications) or by a network node (e.g., ANDSF). By way of example, and not limitation, the one or more rules may specify which interface to use or which algorithm to apply (e.g., mirror, multiplicate, etc).

Embodiments contemplate that if, for example, one or more operational modes may be configured, the outgoing packet filtering function associated with a tagging mode may be executed at various times a packet may need to be transmitted, or each time a packet may need to be transmitted. Alternatively or additionally, embodiments contemplate that if, for example, one or more kernel level executed outgoing packet filtering hooks are used, a hook (e.g., an outgoing packet filtering function) may be registered. The outgoing packets may be intercepted by the packet filtering tool and the registered hook may be called at various times a packet may need to be transmitted or each time a packet may need to be transmitted. In one or more embodiments, incoming packet filtering may or may not be required, hooks for incoming packet filtering may or may not be installed, and incoming packets may or may not be intercepted.

Embodiments contemplate that outgoing packet filtering may be based on the tag added to the outgoing packet. The algorithm may compare the tag with the tags specified in the configured rules. If a match is found, the specified action may be executed. For example, the action may be to send to a specific interface, execute a particular rule, etc. Also by way of example, the rule may specify the outgoing interface.

Figure 4:
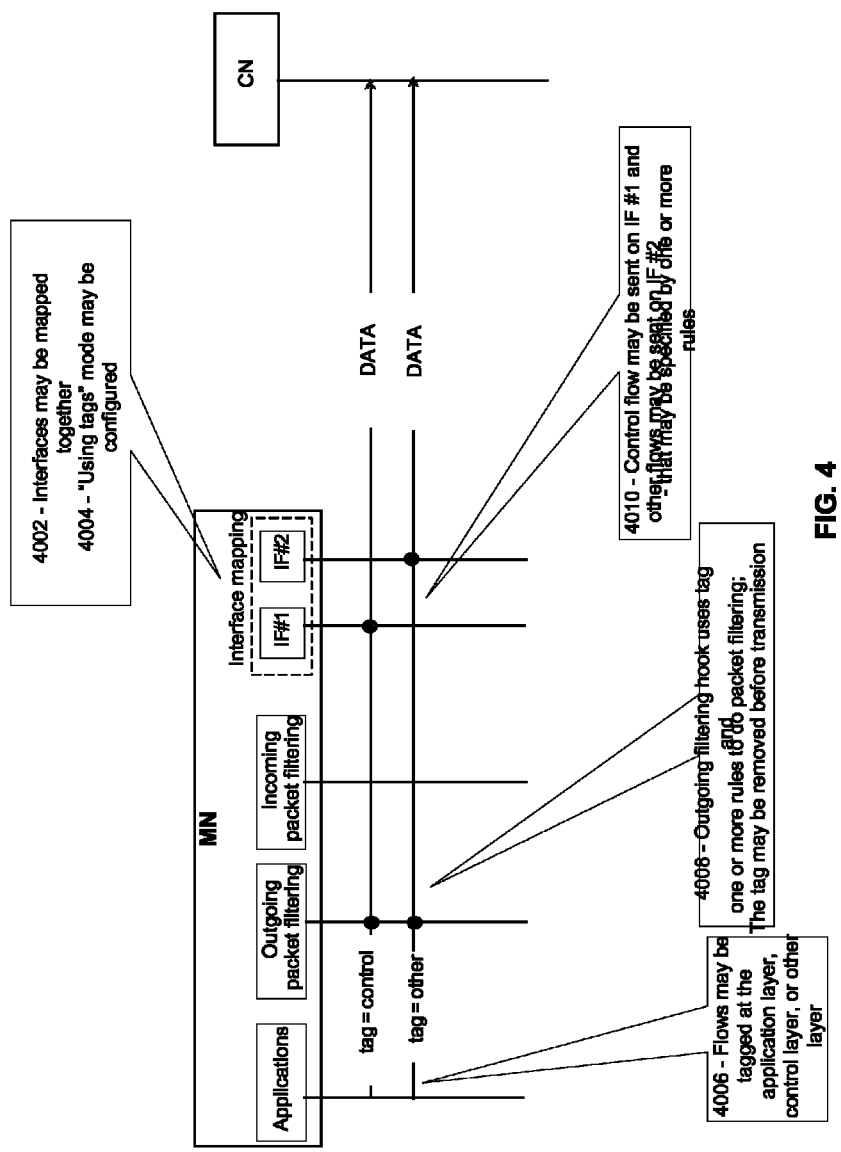
FIG. 4 is another exemplary illustration of packet filtering and/or routing behavior consistent with embodiments.

FIG. 4 is an exemplary illustration of one or more alternative embodiments. In FIG. 4 embodiments contemplate packet filtering and routing behavior when, and in at least some embodiments, a tagging mode may be configured. At 4002, the WTRU (such as a mobile node (MN), for example) in one or more embodiments may map one or more interfaces (IF) together. Alternatively or additionally, at 4004, in embodiments that contemplate the configuration of one or more operational modes, the WTRU (or mobile node (MN)) may configure a tagging mode or a "using tags" mode. One or more embodiments contemplate that some or all application level control packets may be sent on IF #1 and that other types of data may be sent on IF #2. At 4006, one or more flows may be tagged, perhaps at the application layer. In one or more embodiments, the flows may be tagged at a control layer, or one or more other layers, for example. At 4008, one or more outgoing filtering hooks may use one or more tags and/or one or more rules to do packet filtering. In one or more embodiments, the tag may be removed before transmission. At 4010, at least one control flow may be sent on a first interface (IF #1) and one or more other flows may be sent on a second interface (IF #2). Embodiments contemplate that the transmission from the respective interface may be specified by one or more rules.

Embodiments contemplate that the packet filtering capabilities/details described herein may apply to a terminal in uplink and/or downlink as well as to any network node. For example, a base station doing packet forwarding may use the packet filtering methods described herein to implement packet forwarding on uplink and downlink packets. Policies may be configured to determine the forwarding decisions criteria.

Figure 5:
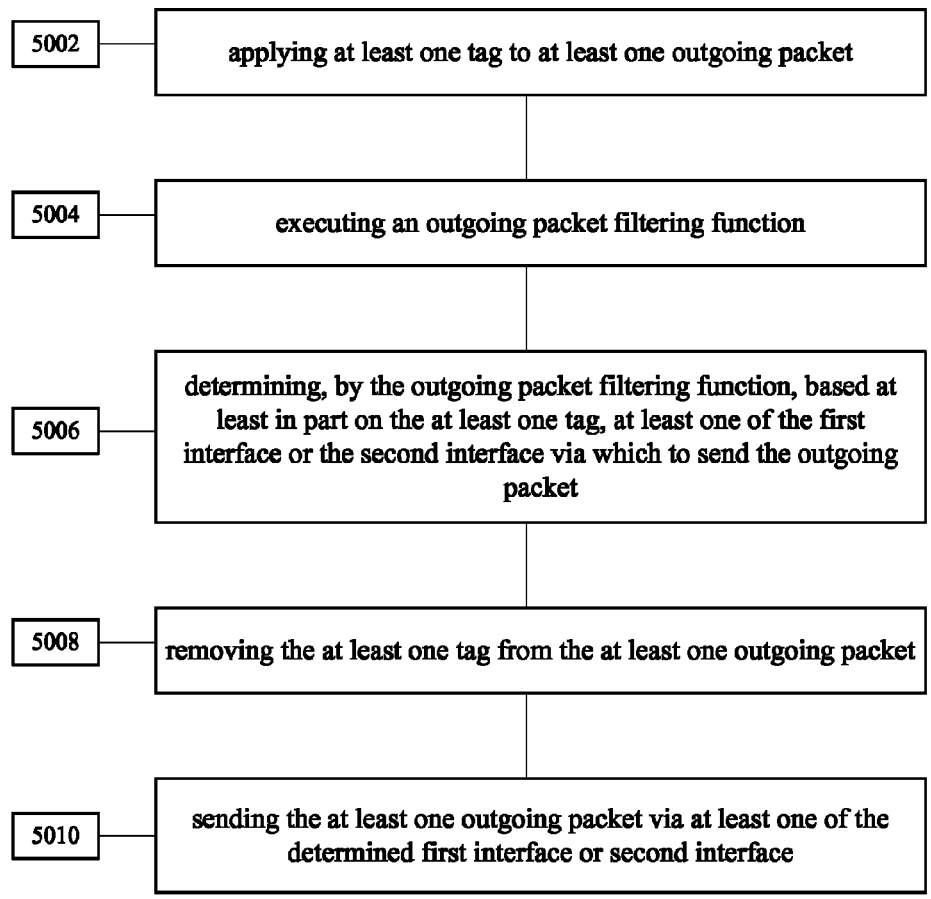
FIG. 5 is a block diagram of a filtering technique consistent with embodiments.

In light of the description herein and referring to FIG. 5, embodiments contemplate that a wireless transmit/receive unit (WTRU) may be configured to implement packet filtering, where the WTRU may include a first interface and a second interface. At 5002, embodiments contemplate applying at least one tag to at least one outgoing packet, and at 5004, executing an outgoing packet filtering function. At 5006, embodiments contemplate determining, by the outgoing packet filtering function, based at least in part on the at least one tag, at least one of the first interface or the second interface via which to send the outgoing packet. At 5008, embodiments contemplate removing the at least one tag from the at least one outgoing packet; and, at 5010, sending the at least one outgoing packet via at least one of the determined first interface or second interface.

One or more embodiments contemplate that the applying the at least one tag to the at least one outgoing packet may be done at a logical layer higher than a layer of the first interface or the second interface. In one or more embodiments, the applying the at least one tag to the at least one outgoing packet may be done at an application layer or a control layer. Also, embodiments contemplate that the at least one tag may designate the at least one outgoing packet as either a control packet or a non-control packet.

One or more embodiments contemplate that the first interface may be mapped with the second interface. Also, embodiments contemplate that the determining by the outgoing filtering function at 5006 may be further based on one or more predetermined rules.

Alternatively or additionally, embodiments contemplate configuring at least one mode on the WTRU, where the executing the outgoing packet filtering function of 5004 may include executing an outgoing packet filtering function associated with the at least one mode. Also, in one or more embodiments, the determining by the outgoing packet filtering function of 5006 may be executed at a time proximate to the sending of the at least one outgoing packet.

Alternatively or additionally, embodiments contemplate registering at least one hook on the WTRU, where the executing the outgoing packet filtering function of 5004 may include calling the at least one hook. Also, the determining by the outgoing packet filtering function of 5006 may executed by the at least one hook at a kernel level at a time proximate to the sending of the at least one outgoing packet.

Alternatively or additionally, one or more embodiments contemplate that the removing the at least one tag from the at least one outgoing packet of 5008 may be performed by the outgoing packet filter function associated with the at least one mode. Alternatively or additionally, one or more embodiments contemplate that the removing the at least one tag from the at least one outgoing packet of 5008 may be performed by the at least one hook at the kernel level.

Figure 6:
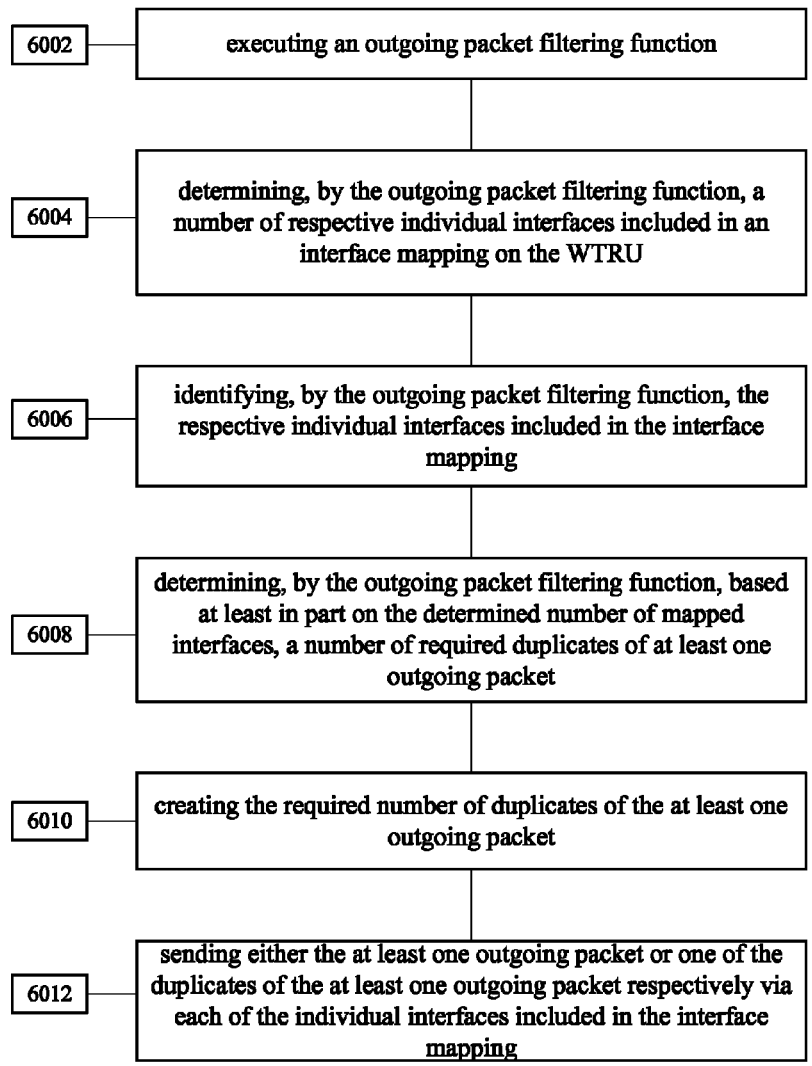
FIG. 6 is a block diagram of another filtering technique consistent with embodiments.

Referring to FIG. 6, embodiments contemplate that a wireless transmit/receive unit (WTRU) may be configured to implement packet filtering. At 6002, one or more embodiments contemplate executing an outgoing packet filtering function. One or more embodiments also contemplate, at 6004, determining, by the outgoing packet filtering function, a number of respective individual interfaces included in an interface mapping on the WTRU, and at 6006, identifying, by the outgoing packet filtering function, the respective individual interfaces included in the interface mapping. At 6008, embodiments contemplate determining, by the outgoing packet filtering function, based at least in part on the determined number of mapped interfaces, a number of required duplicates of at least one outgoing packet. At 6010, embodiments contemplate creating the required number of duplicates of the at least one outgoing packet, and at 6012 sending either the at least one outgoing packet or one of the duplicates of the at least one outgoing packet respectively via each of the individual interfaces included in the interface mapping.

Alternatively or additionally, embodiments contemplate configuring at least one mode on the WTRU, where the executing the outgoing packet filtering function at 6002 may include executing an outgoing packet filtering function associated with the at least one mode. Also, one or more embodiments contemplate that at least the determining by the outgoing packet filtering function the number of interfaces included in the interface mapping of 6004 may be executed at a time proximate to the sending of either the at least one outgoing packet or one of the duplicates of the at least one outgoing packet. One or more embodiments also contemplate that the identifying of 6006, the determining of 6008, and/or the duplicating of 6010 may also be executed at a time proximate to the sending of either the at least one outgoing packet or one of the duplicates of the at least one outgoing packet.

Alternatively or additionally, embodiments contemplate registering at least one hook on the WTRU, where the executing the outgoing packet filtering function of 6002 may include calling the at least one hook, and at least the determining by the outgoing packet filtering function the number of interfaces included in the interface mapping of 6004 may be executed by the at least one hook at a kernel level at a time proximate to the sending of either the at least one outgoing packet or one of the duplicates of the at least one outgoing packet. One or more embodiments also contemplate that the identifying of 6006, the determining of 6008, and/or the duplicating of 6010 may also be executed by the at least one hook at a kernel level at a time proximate to the sending of either the at least one outgoing packet or one of the duplicates of the at least one outgoing packet.

Figure 7:
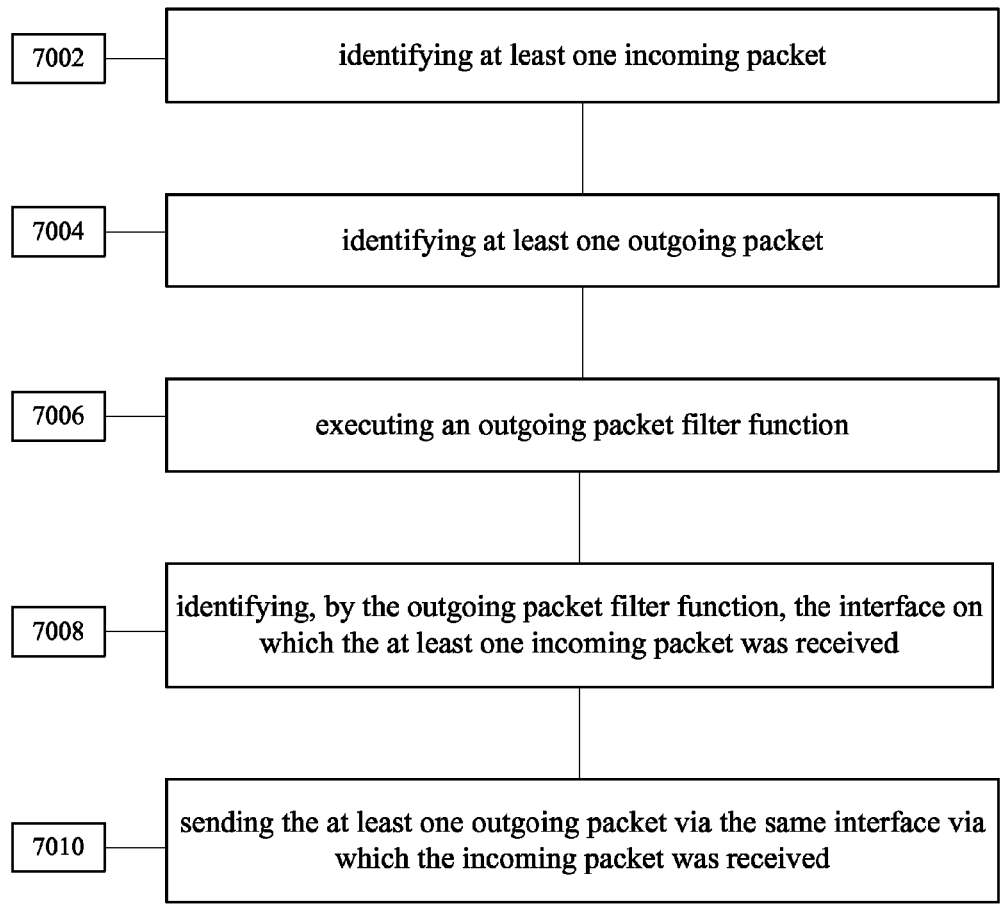
FIG. 7 is a block diagram of another filtering technique consistent with embodiments.

Referring to FIG. 7, embodiments contemplate a wireless transmit/receive unit (WTRU) that may be configured to implement packet filtering. One or more embodiments contemplate, at 7002, identifying at least one incoming packet, where the at least one incoming packet may be received via an interface of the WTRU. Embodiments also contemplate, at 7004, identifying at least one outgoing packet, where the at least one outgoing packet may corresponding to the at least one incoming packet. One or more embodiments contemplate, at 7006, executing an outgoing packet filter function, and at 7008, identifying, by the outgoing packet filter function, the interface on which the at least one incoming packet was received. At 7010, embodiments contemplate sending the at least one outgoing packet via the same interface via which the incoming packet was received.

Figure 8:
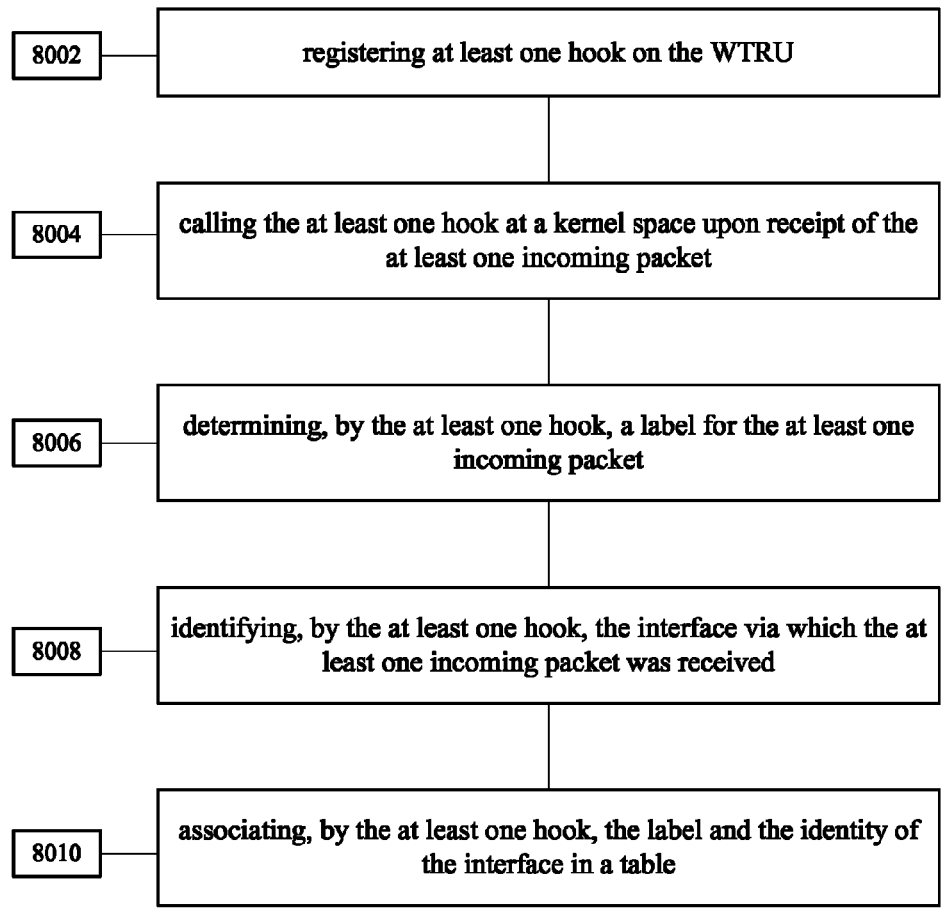
FIG. 8 is a block diagram of another filtering technique consistent with embodiments.

Alternatively or additionally, referring to FIG. 8, one or more embodiments contemplate, at 8002, registering at least one hook on the WTRU. Embodiments also contemplate that the identifying the at least one incoming packet of 7002 of FIG. 7 may include, at 8004, calling the at least one hook at a kernel space upon receipt of the at least one incoming packet, and at 8006, determining, by the at least one hook, a label for the at least one incoming packet. At 8008, embodiments contemplate identifying, by the at least one hook, the interface via which the at least one incoming packet was received. Also, at 8010, embodiments contemplate associating, by the at least one hook, the label and the identity of the interface in a table.

Alternatively or additionally, embodiments contemplate that the determining, by the at least one hook, the label for the at least one incoming packet of 8006, may include assigning at least one of a five tuple designation or a six tuple designation to the at least one incoming packet. One or more embodiments contemplate that the five tuple designation may include at least one of a source internet protocol (IP) address, a destination IP address, a source port number, a destination port number, or a protocol type, and the six tuple designation may include at least one of a source IP address, a destination IP address, a source port number, a destination port number, a protocol type, or an IP flow level.

Figure 9:
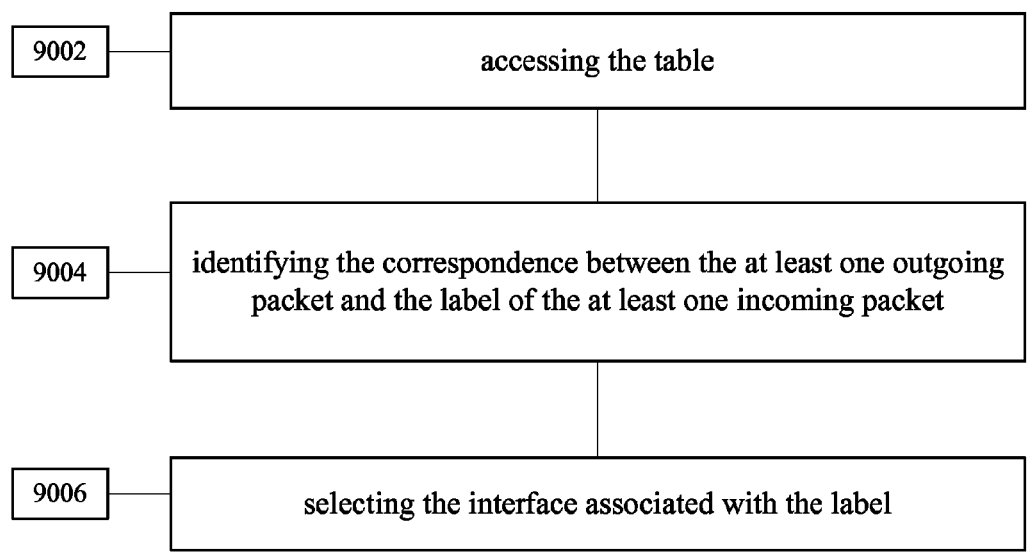
FIG. 9 is a block diagram of another filtering technique consistent with embodiments.

Alternatively or additionally, referring to FIG. 9, embodiments contemplate that the identifying, by the outgoing packet filter function, the interface on which the at least one incoming packet was received of 7008 of FIG. 7 may include, at 9002 accessing the table, and at 9004, identifying the correspondence between the at least one outgoing packet and the label of the at least one incoming packet. Embodiments also contemplate, at 9006, selecting the interface associated with the label.

Alternatively or additionally, embodiments contemplate configuring at least one mode on the WTRU, where the executing the outgoing packet filtering function of 7006 of FIG. 7 may include executing an outgoing packet filtering function associated with the at least one mode. One or more embodiments also contemplate that the identifying, by the outgoing packet filter function, the interface on which the at least one incoming packet was received of 7008 of FIG. 7 may be executed at a time proximate to the sending of the at least one outgoing packet.

Alternatively or additionally, one or more embodiments contemplate registering at least one hook on the WTRU, where the executing the outgoing packet filtering function of 7006 of FIG. 7 may include calling the at least one hook. One or more embodiments also contemplate that the identifying, by the outgoing packet filter function, the interface on which the at least one incoming packet was received of 7008 of FIG. 7 may be executed by the at least one hook at a kernel level at a time proximate to the sending of the at least one outgoing packet.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU) to implement packet filtering, the WTRU including a first interface and a second interface, the method comprising: configuring at least one mode of a plurality of modes on the WTRU, the plurality of modes corresponding to a plurality of packet traffic flow control techniques; determine at least one outgoing packet to be sent from the WTRU; applying at least one tag to at the least one outgoing packet; registering at least one hook on the WTRU; executing an outgoing packet filtering function associated with the at least one mode of the plurality of modes, the executing the outgoing packet filtering function including calling the at least one hook; determining, by the outgoing packet filtering function, based at least in part on the at least one tag, at least one of the first interface or the second interface via which to send the at least one outgoing packet; removing the at least one tag from the at least one outgoing packet by the outgoing packet filtering function associated with the at least one mode of the plurality of modes; and sending the at least one outgoing packet from the WTRU via at least one of the determined first interface or second interface, the determining by the outgoing packet filtering function of the at least one of the first interface or the second interface being executed by the at least one hook at a kernel level at a time proximate to the sending of the at least one outgoing packet.

2. The method of claim 1, wherein the applying the at least one tag to the at least one outgoing packet is done at a logical layer higher than a layer of the first interface or the second interface.

3. The method of claim 2, wherein the applying the at least one tag to the at least one outgoing packet is done at an application layer or a control layer.

4. The method of claim 1, wherein the at least one tag designates the at least one outgoing packet as either a control packet or a non-control packet.

5. The method of claim 1, further comprising mapping the first interface with the second interface.

6. The method of claim 1, wherein the determining by the outgoing filtering function is further based on one or more predetermined rules.

7. The method of claim 1, wherein the removing the at least one tag from the at least one outgoing packet is performed by the at least one hook at the kernel level.

8. A method performed by a wireless transmit/receive unit (WTRU) to implement packet filtering, the method comprising: identifying at least one incoming packet to the WTRU, the at least one incoming packet received via a first interface of the WTRU; identifying at least one outgoing packet to be sent from the WTRU, the at least one outgoing packet corresponding to the at least one incoming packet; configuring at least one mode of a plurality of modes on the WTRU, the plurality of modes corresponding to a plurality of packet traffic flow control techniques; registering at least one hook on the WTRU; executing a bonding function, the bonding function associated with the at least one mode of the plurality of modes, the executing of the bonding function including calling the at least one hook; identifying, by the bonding function, the first interface on which the at least one incoming packet was received; mapping, by the bonding function, the first interface on which the at least one incoming packet was received to a second interface via which to send the at least one outgoing packet, the mapping forming a virtual interface; and sending the at least one outgoing packet from the WTRU via the virtual interface, the mapping by the bonding function being executed by the at least one hook at a kernel level at a time proximate to the sending of the at least one outgoing packet.

9. A method performed by a wireless transmit/receive unit (WTRU) to implement packet filtering, the method comprising: identifying at least one incoming packet, the at least one incoming packet received via an interface of the WTRU and the at least one incoming packet including a source address; identifying at least one outgoing packet to be sent from the WTRU, the at least one outgoing packet corresponding to the at least one incoming packet; configuring at least one mode of a plurality of modes on the WTRU, the plurality of modes corresponding to a plurality of packet traffic flow control techniques; registering at least one hook on the WTRU; executing a bridging function, the bridging function associated with the at least one mode of the plurality of modes, the executing of the bridging function including calling the at least one hook; identifying, by the bridging function, the source address of the at least one incoming packet; and sending the at least one outgoing packet from the WTRU to the source address via the -interface via which the incoming packet was received, the identifying by the bridging function being executed by the at least one hook at a kernel level at a time proximate to the sending of the at least one outgoing packet.

10. The method of claim 9, wherein the identifying the at least one incoming packet includes: calling the at least one hook at a kernel space upon receipt of the at least one incoming packet; determining, by the at least one hook, a label for the at least one incoming packet; identifying, by the at least one hook, the interface via which the at least one incoming packet was received; and associating, by the at least one hook, the label and the identity of the interface in a table.

11. The method of claim 10, wherein the determining, by the at least one hook, the label for the at least one incoming packet includes assigning at least one of a five tuple designation or a six tuple designation to the at least one incoming packet.

12. The method of claim 11, wherein the five tuple designation includes at least one of a source internet protocol (IP) address, a destination IP address, a source port number, a destination port number, or a protocol type, and the six tuple designation includes at least one of a source IP address, a destination IP address, a source port number, a destination port number, a protocol type, or an IP flow level.

13. The method of claim 10, wherein the identifying, by the bridging function, the interface on which the at least one incoming packet was received includes: accessing the table; identifying the correspondence between the at least one outgoing packet and the label of the at least one incoming packet; and selecting the interface associated with the label.

* * * * *